(12) United States Patent
Ternon et al.

(10) Patent No.: US 7,614,436 B2
(45) Date of Patent: Nov. 10, 2009

(54) WEFT INSERTED WARP KNIT FABRIC FOR TIRE CAP PLY

(75) Inventors: Gerard L. R. Ternon, Bolbec (FR); Dany F. Michiels, Haaltert (BE)

(73) Assignee: Milliken & Company, Spartanburg, SC (US)

( * ) Notice: Subject to any disclaimer, the term of this patent is extended or adjusted under 35 U.S.C. 154(b) by 420 days.

(21) Appl. No.: 11/348,559

(22) Filed: Feb. 6, 2006

(65) Prior Publication Data

US 2007/0181238 A1    Aug. 9, 2007

(51) Int. Cl.
*B60C 9/00* (2006.01)
*B60C 9/18* (2006.01)

(52) U.S. Cl. .................. 152/526; 152/527; 152/531; 152/533

(58) Field of Classification Search ............... 152/526, 152/527, 531, 533
See application file for complete search history.

(56) References Cited

U.S. PATENT DOCUMENTS

| 1,300,696 | A | 4/1919 | Branson |
| 4,215,684 | A | 8/1980 | Westip ..................... 128/156 |
| 4,284,117 | A | 8/1981 | Poque et al. |
| 4,331,135 | A | 5/1982 | Westip ..................... 128/156 |
| 4,433,493 | A | 2/1984 | Poisson ..................... 34/116 |
| 4,443,516 | A | 4/1984 | Rogers ..................... 428/253 |
| 4,498,514 | A | 2/1985 | Maathuis et al. ............ 152/356 |
| 4,739,814 | A | 4/1988 | Berczi et al. ............... 152/527 |
| 4,744,401 | A | 5/1988 | Sowa et al. ................. 152/559 |
| 5,365,988 | A | 11/1994 | Soderberg et al. ........... 152/527 |
| 5,632,526 | A | 5/1997 | McLarty, III et al. ..... 297/452.64 |
| 5,642,633 | A | 7/1997 | Pedell ........................ 66/193 |
| 5,950,457 | A | 9/1999 | Wagner, Jr. et al. ........... 66/192 |
| 6,706,376 | B1 | 3/2004 | Von Fransecky ............ 428/212 |

FOREIGN PATENT DOCUMENTS

| EP | 0131954 | | 1/1985 |
| EP | 624667 | * | 11/1994 |
| EP | 732225 | * | 9/1996 |
| JP | 60-22503 | * | 2/1985 |
| JP | 60022503 | | 2/1985 |
| JP | 60121102 | | 6/1985 |
| JP | 60-189606 | * | 9/1985 |
| JP | 60240505 | | 11/1985 |
| JP | 61-115702 | * | 6/1986 |
| JP | 11-245614 | * | 9/1999 |
| JP | 2003-191713 | * | 7/2003 |
| WO | WO 2005/002883 | | 1/2005 |

* cited by examiner

Primary Examiner—Justin Fischer
(74) Attorney, Agent, or Firm—Cheryl J. Brickey (57) ABSTRACT

A pneumatic tire has a tread, a carcass with belt plies disposed below the tread, and a cap ply layer between the tread and the belt plies of the carcass. The cap ply is a weft inserted warp knit fabric tape comprising an in-lay warp yarn set, a weft inserted yarn set, and a stitching yarn set, wherein the stitching yarn set forms a repeating stitch pattern on each warp yarn comprising a sequence of at least 2 stitches around the warp yarn from one stitching yarn and at least 2 stitches around the warp yarn from the adjacent stitching yarn. The tape is wound in a flat helically wound around the belt plies and covered with a tread of the tire.

24 Claims, 13 Drawing Sheets

| ① | ② |
|---|---|
| 1 | 0 |
| 0 | 0 |
| 0 | 1 |
| 1 | 1 |
| 1 | 0 |
| 0 | 0 |
| 1 | 1 |
| 2 | 1 |
| 2 | 0 |
| 1 | 0 |
| 1 | 1 |
| 2 | 1 |

| 1 | 0 |
|---|---|
| 2 | 0 |
| 2 | 1 |
| 1 | 1 |
| 1 | 0 |
| 2 | 0 |
| 2 | 1 |
| 1 | 1 |
| 1 | 0 |
| 0 | 0 |
| 0 | 1 |
| 1 | 1 |
| 1 | 0 |
| 0 | 0 |
| 0 | 1 |
| 1 | 1 |

| 1 | 0 |
| 0 | 0 |
| 0 | 1 |
| 1 | 1 |
| 1 | 0 |
| 0 | 0 |
| 0 | 1 |
| 1 | 1 |
| 1 | 0 |
| 0 | 0 |
| 1 | 1 |
| 2 | 1 |
| 2 | 0 |
| 1 | 0 |
| 1 | 1 |
| 2 | 1 |
| 2 | 0 |
| 1 | 0 |
| 1 | 1 |
| 2 | 1 |

| 1 | 0 |
|---|---|
| 0 | 0 |
| 0 | 1 |
| 1 | 1 |
| 1 | 0 |
| 0 | 0 |
| 0 | 1 |
| 1 | 1 |
| 1 | 0 |
| 0 | 0 |
| 0 | 1 |
| 1 | 1 |
| 2 | 0 |
| 2 | 1 |
| 1 | 1 |
| 1 | 0 |
| 2 | 0 |
| 2 | 1 |
| 1 | 1 |
| 1 | 0 |
| 2 | 0 |
| 2 | 1 |
| 1 | 1 |

WEFT INSERTED WARP KNIT FABRIC FOR TIRE CAP PLY

BACKGROUND

The present invention generally relates to pneumatic tires, and in particular, to construction of ply tires with belt plies.

Typically, tires are manufactured from a single or multiply carcass of substantially U-shaped section having metal beads at the inner perimeters of the walls. Support can be provided to a tire carcass by steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties. Support such as this type is particularly important in a radial tire, where the carcass is formed from a rubberized woven fabric having relatively inextensible reinforcing cords running transversely, i.e. radially, from bead to bead.

Technical difficulties have been encountered in incorporating steel belts into the tread area of the tire. One of the difficulties lies in ensuring good adhesion between the steel and the rubber. The centrifugal force of the steel belts can cause difficulty in the adhesion of the belt within the tire. Additionally, movement of the steel belts at higher speeds tends to create excessive temperatures in the tire, which can cause tread failure and delamination. The problem of delamination is particularly noticeable in the shoulder area of the tire.

One solution of the problem previously used by tire manufactures is to use a layer of calendared fabric laid circumferentially over the belt. This calendared fabric can also be used with wide fabric strips placed over the shoulder area of the tire, retaining the edges of the steel belt in a specific location of the tire. An example of this type of tire can be found in U.S. Pat. No. 4,284,117, issued to Poque et al. on 18 Aug. 1981. In order to cover the entire circumference of the tire and be retained in place, the prior art fabric must overlap itself across the width of tire at some location on the circumference. The overlapping area helps retain the prior art fabric around the circumference of the tire. However, because this type of overlapping adds weight, the potential length of the overlap is limited. A shorter overlap limits the length of the fabric and thereby the strength that the fabric can give to the tire. Additionally, the overlapping section of the fabric causes an uneven thickness of the fabric around the circumference.

To overcome this difficulty, a rubber tape was formed that had cords disposed longitudinally within the tape, and was wound around the belt plies and across the width of the tire. An example of this type of tire can be found in WO 2005/002883, filed by Pirelli Pneumatic S.P.A., and published on 13 Jan. 2005. The continuous nature of the tape provided greater strength. However, the longitudinal yarns were positioned in a spaced apart relationship by the rubber of the tape, which does not provide resistance to the separation of the yarns by items that probe at the area between the yarns.

Sowa et al. (EP 0131954) discloses a knitted fabric for use as tire reinforcement. " . . . the knitting fabric is formed by arranging warps parallel to one another and twining a knitting yarn of a fine fiber around the warps to keep each space between the warps constant." However, the Sowa patent warps cannot be kept exactly parallel and at the same spacing because the wefts are set "roughly on the warps to cross the warps at almost right angles without weaving and twining a knitting yarn of a fine fiber around the warps and wefts" (claim 2, lines 3-6). The fine fibers do not adequately fasten the adjacent warps together to hold them parallel and at the correct spacing and would fray if cut. Knitting yarn 22 of FIG. 3 connects adjacent warp yarns, but is too loose to hold spacing constant between the warp yarns. It would be desirable to have a knitted fabric that had the warps parallel and evenly spaced and that resisted fraying when cut for use in a tire cap ply.

Hence, as a solution to overcome the above difficulties, the present invention provides a pneumatic tire 100 comprising a tread 500, a carcass 200 having at least one belt ply 230 disposed below the tread 500, and a cap ply 300 located between the carcass 200 and the tread 500, wherein the cap ply comprises at least one layer of a weft inserted warp knit fabric tape 310 comprising an in-lay warp yarn set, a weft inserted yarn set, and a stitching yarn set, wherein the stitching yarn set forms a repeating stitch pattern on each warp yarn comprising a sequence of at least 2 stitches around the warp yarn from one stitching yarn and at least 2 stitches around the warp yarn from the adjacent stitching yarn, disposed in a flat helical pattern around the circumference of the carcass 200 in the area of at least one belt ply 230.

BRIEF DESCRIPTION OF THE DRAWINGS

An embodiment of the present invention will now be described by way of example, with reference to the accompanying drawings.

FIG. 2 is a cross-sectional view corresponding to FIG. 1a;

DETAILED DESCRIPTION

Figure 1A:
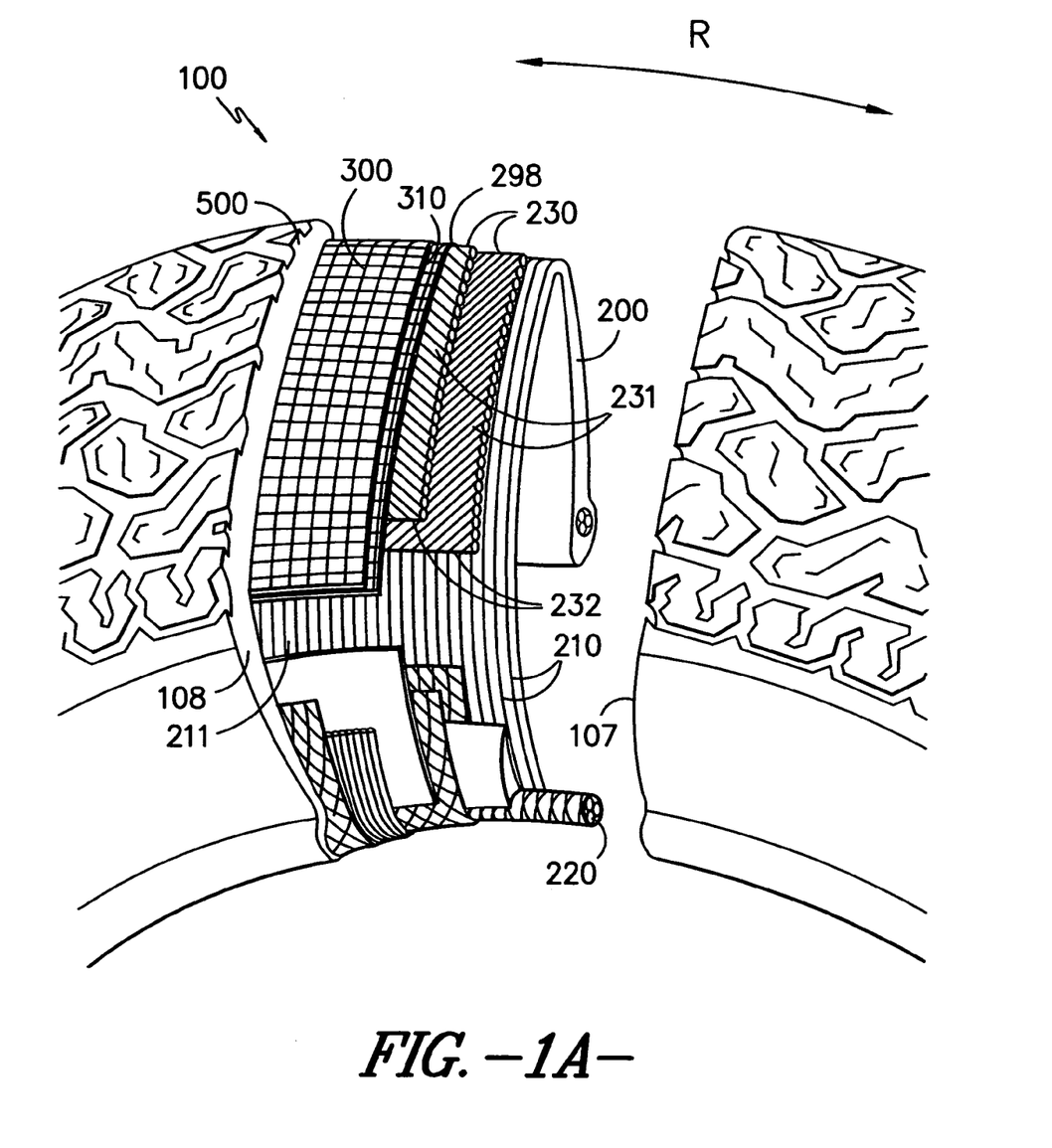
FIG. 1A is a cutaway partial view of a pneumatic radial tire illustrating one embodiment of the invention with one cap ply strip wrapped around the carcass.
Figure 1B:
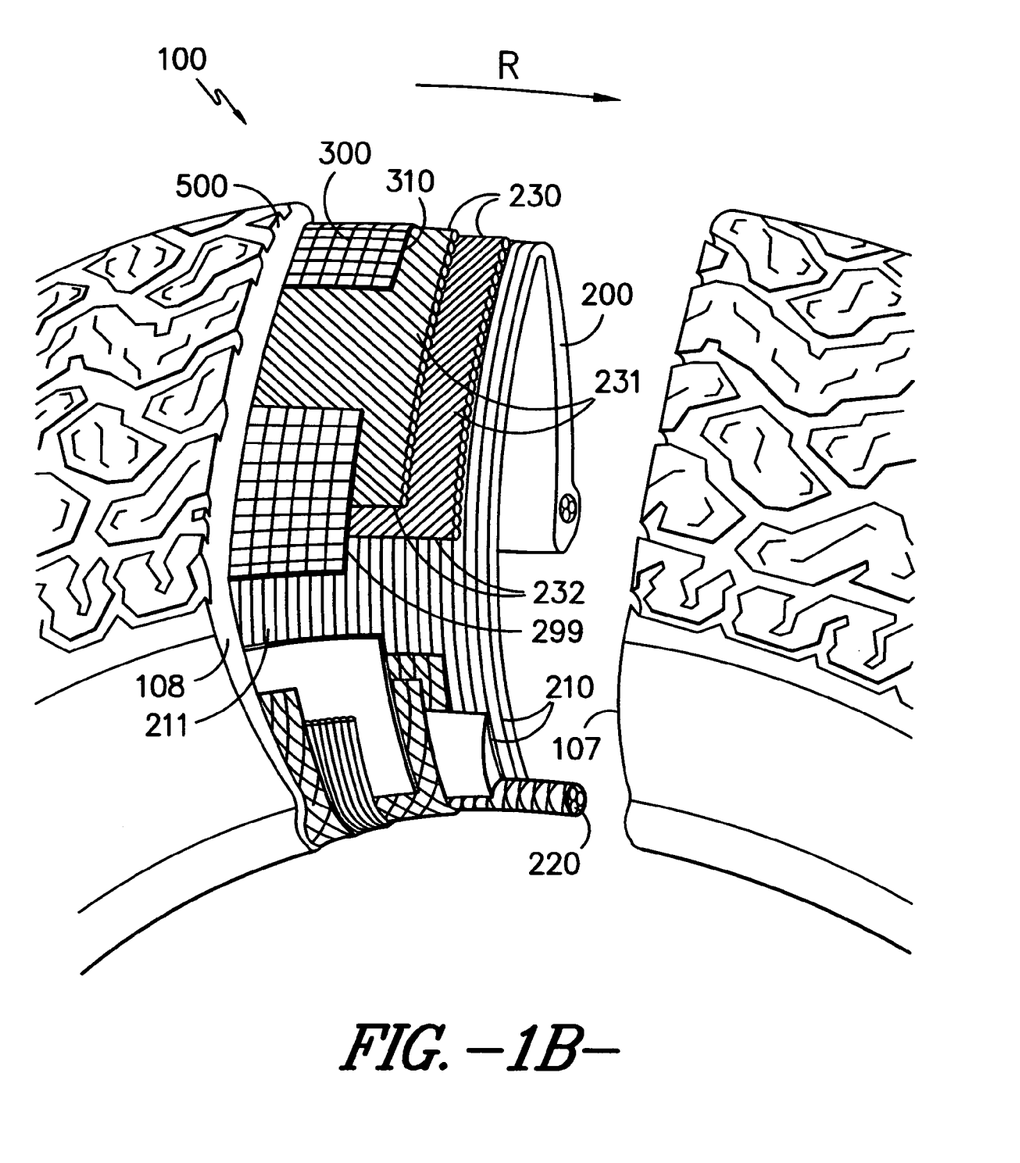
FIG. 1B is a cutaway partial view of a pneumatic radial tire illustrating one embodiment of the invention with two cap ply strips wrapped around the carcass.
Figure 1C:
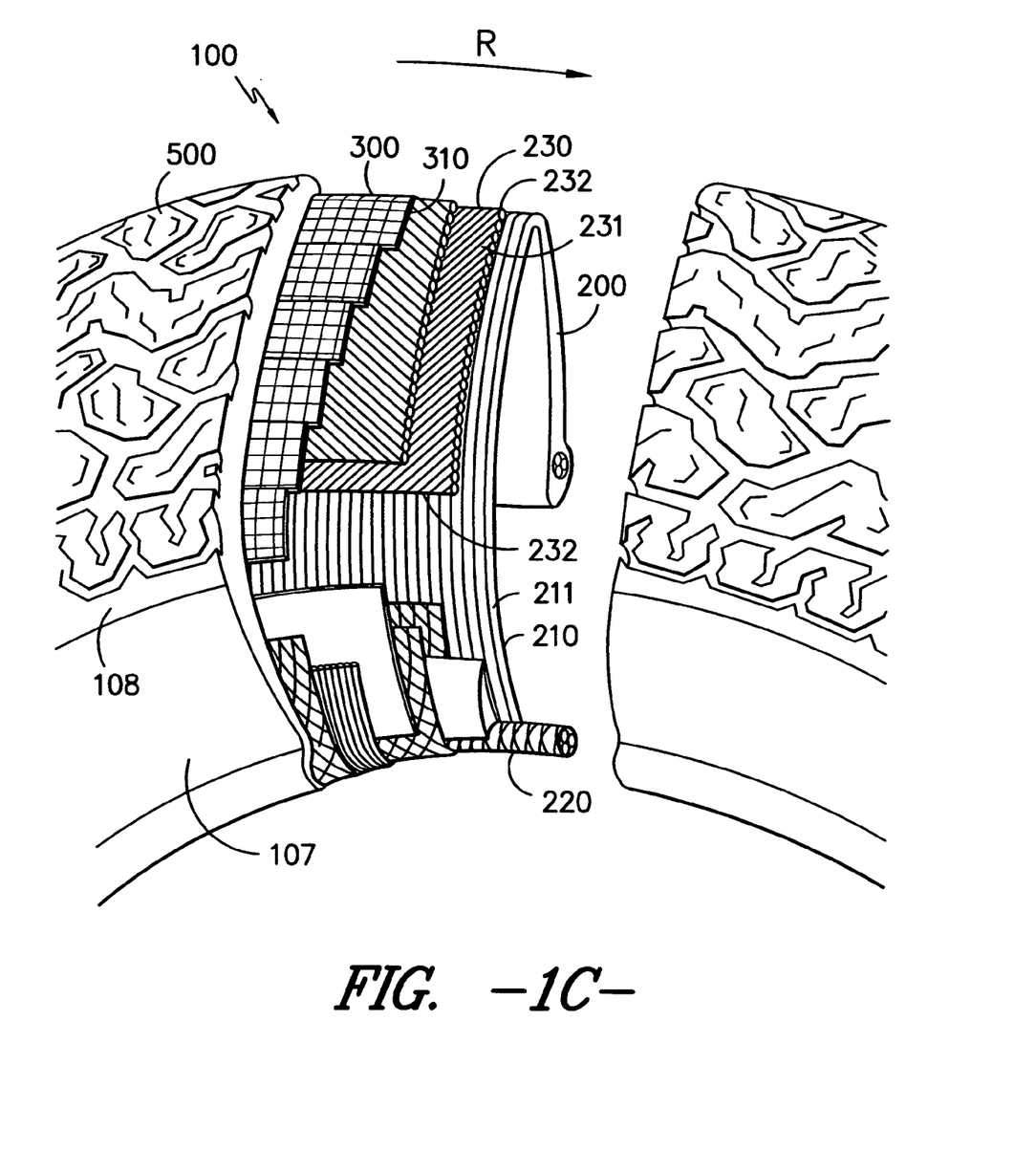
FIG. 1C is a cutaway partial view of a pneumatic radial tire illustrating one embodiment of the invention where the cap ply is wrapped helically.
Figure 2:
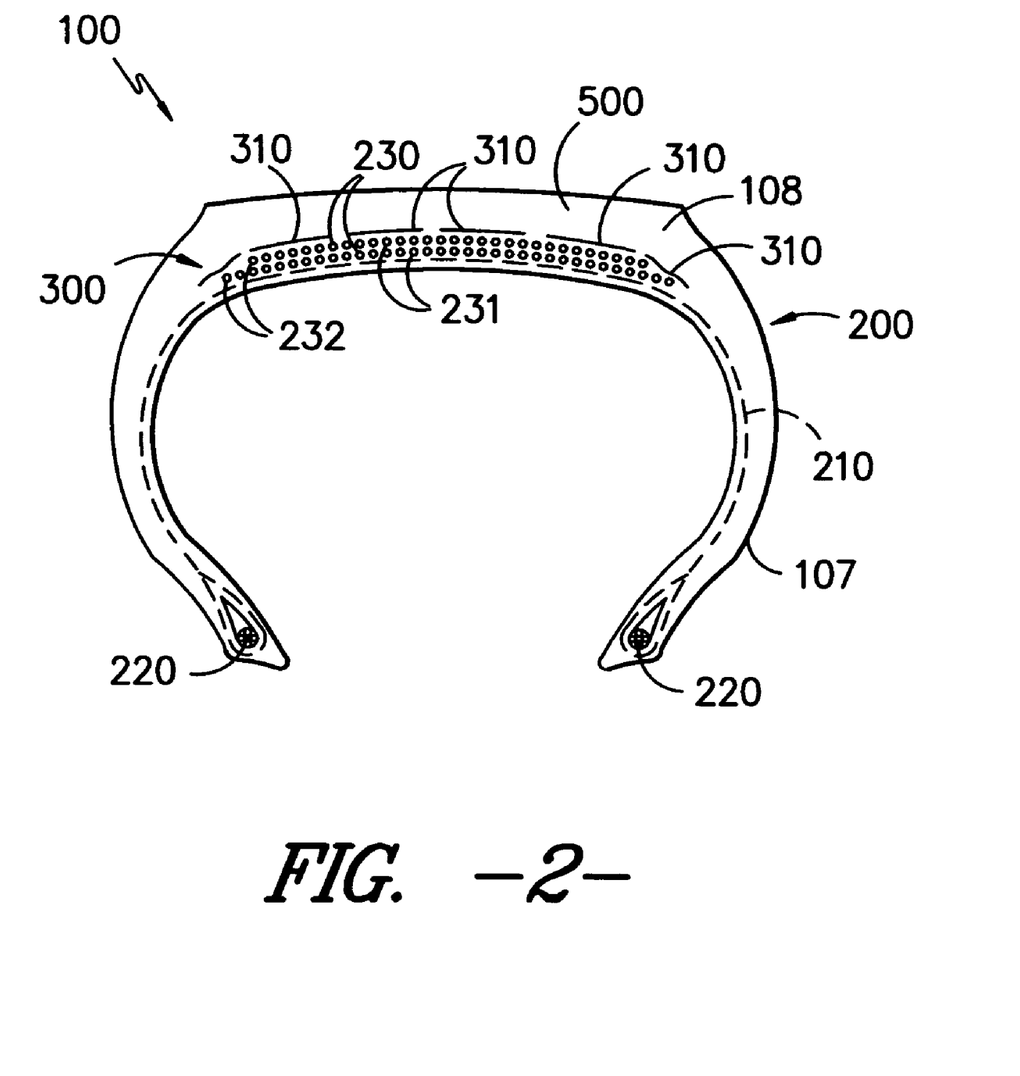

Referring now to the drawings, particular to FIGS. 1A-1C, there is shown a tire 100, comprising side walls 107 joined to a tread 500 by shoulders 108. The tire 100 includes a carcass 200 covered by the tread 500. In FIGS. 1A-1Cc and 312, the tire 100 is a radial tire. However, the present invention is not limited to radial tires and can also be used with other tire constructions. The carcass 200 is formed from one or more plies of tire cord 210 terminating at the inner periphery of the tire in metal beads 220, with at least one belt ply 230 located circumferentially around the tire cord 210 in the area of the tread 500. The tire cord 210 is a rubberized woven fabric having its warp yarns formed from relatively inextensible reinforcing cords 211. In the tire shown in FIGS. 1A-C, the carcass 200 is constructed so that the reinforcing cords 211 are running substantially radially of the intended direction of rotation R of the tire 100. The belt plies 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The belt plies 230 extend across the width of the tread 500 of the tire terminating in edges 232 in the area of the shoulder 108 of the tire 100, i.e. the area where the tread 500 meets the side wall 107.

In the present invention, a cap ply layer 300 (in FIGS. 1A-C) is located between the belt plies 230 and the tread 500. In FIG. 1A, the cap ply layer 300 is formed from a weft inserted warp knit fabric tape 310 (also called a weft insertion warp knit fabric tape) wound around the tire cord 210 in the rolling direction of the tire. In the embodiment illustrated in FIG. 1A, the weft inserted warp knit fabric tape 310 extends over the edges 232 of the belt plies 230. Additionally, the weft inserted warp knit fabric tape 310 in FIG. 1A can be wound around the tire cord 210 a plurality of times to reduce the unbalancing effect in the tire 100 caused by the overlap splice. FIG. 1B, the cap ply layer 300 is formed from a weft inserted warp knit fabric tape 310 which extends over the edge 232 of the belt plies 230. The cap ply layer 300 in FIG. 1C is formed from a weft inserted warp knit fabric tape 310 which is wound circumferentially around the carcass 200 of the tire 100 in a flat helical pattern. The weft inserted warp knit fabric tapes 310 in each of the FIGS. 1A-C are made of the same fabric. The width of the fabric 310 and how it is wrapped varies between the FIGS. 1A-C.

The weft inserted warp knit fabric tape 310, generally comprises a set of in-lay warp yarns 312, a set of weft inserted yarns 313, and a set of stitching yarns 311, each stitching yarn 311 forms a repeating wale stitch pattern on an associated pair of warp yarns 312 where a sequence of at least 2 stitches are formed around the first warp yarn 312 by the stitching yarn 311 and at least 2 stitches are subsequently formed around the adjacent warp yarn 312 by the stitching yarn 311. The in-lay warp yarn 312 is stabilized and maintained in a parallel way in the machine direction (MD) with a particular chain stitch of the stitching yarns 311 along the warp yarns 312. The alternative joinings of the warp yarns 312 by the wales forms a parallel and equal interval between the wales. The stitching yarn 311 maintains the in-lay warp yarn 312 in a parallel way jointly with a weft inserted yarns 313 in dedicated stitches of the stitching yarn 311.

The weft inserted warp knit fabric tape 310 can be formed from a weft inserted warp knit fabric. The fabric tape 310 of the invention can be produced on a Weft Inserted Warp Knit Machine which is wider and faster than a traditional weaving machine making the process economical. The weft inserted warp knit machine further stabilizes the fabric with the inserted of a weft yarn 313 in chosen stitches of the stitching yarn 311. Slitting between the wales of warp yarns can be done with limited de-knitting or fraying. This limited or no de-knitting or fraying when slitting enables precise cutting without cutting the in-lay warp yarns 312.

The warp yarns 312 extend longitudinally along the weft inserted warp knit fabric tape 310, which also wrap around the carcass 200 due to the wrapping of the weft inserted warp knit fabric tape 310 around the carcass 200. It is the warp yarns 312 that provide most of the reinforcement of the cap ply layer 300. The construction, material, size, and spacing of the in-lay warp yarns 312, weft inserted yarns 313 and stitching yarns 311 are selected such that they provide the desired strength of the cap ply layer 300 to prevent the belt ply 230 from moving outward in the tire 100 and to protect the rubber in the tire 100 from sharp portions of the belt plies 230.

The in-lay warp yarns 312 can be a spun staple yarn, a multifilament yarn, and/or a monofilament yarn and are formed of a material which will restrain the belt plies 230. Some suitable materials for the in-lay warp yarns include polyamide, aramides (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, polyacrylic or other known artificial or natural fibers. In one embodiment, the in-lay warp yarns 312 may be single monofilament or multifilaments yarns (twisted and/or cabled cords) made with any of the prior listed materials, also including hybrid yarns, or film-tape yarns. In one embodiment, the in-lay warp yarns 312 used should be between 100 decitex (90 deniers) up to 23,500 decitex (21,000 deniers) made with single or multiple yarns (for example, 235 decitex (single end) or 235 decitex×2×3 plies equals 1,410 decitex or 1,100 decitex×3×3 plies equal to 9,900 decitex (multiple ends)).

The weft inserted yarns 313 can be a spun staple yarn, a multifilament yarn, and/or a monofilament yarn. Some examples of suitable materials for the weft yarns include cotton, rayon, polyester, polyamide, aramides (including meta and para forms), nylon (including nylon 6, nylon 6,6, and nylon 4,6), PVA (polyvinyl alcohol), PEN, polyester, rayon, fiberglass, polyolefin, polyvinyl, steel, carbon, polyacrylic or any other known artificial or natural fibers. In one embodiment, the weft inserted yarns 313 used should be between 100 decitex (90 deniers) up to 23,500 decitex (21,000 deniers) made with single or multiple yarns (for example, 235 decitex (single end) or 235 decitex×2×3 plies equals 1,410 decitex or 1,100 decitex×3×3 plies equal to 9,900 decitex (multiple ends)).

The stitching yarn 311 can be made of nature and man-made fibers including cotton, rayon, polyester, polyamide, aramides (including meta and para forms), nylon (including nylon 6, nylon 6,6, and nylon 4,6), PEN, PVA (polyvinyl alcohol), polyester, rayon, fiberglass, polyolefin, polyvinyl, steel, carbon, polyacrylic or any other known synthetic technical raw material or artificial or natural fibers. The preferred stitching yarns 311 could be made with any single monofilament or multifilaments yarns as any multiply twisted yarns made also with monofilament or multifilaments yarns made with any of the prior listed materials. The preferred stitching yarn 311 used should be between 22 decitex (20 deniers) up to 470 decitex (420 deniers) also in single yarn or multiple yarns as 78 decitex multiple filaments or 78 decitex multiple filaments×2 (doubled) to obtain a twisted or parallel yarns at 156 decitex.

In one embodiment, the weft inserted yarns 313, in-lay warp yarns 312, and/or stitching yarns 311 may also be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. Some preferred hybrid yarns include an aramide fiber with a nylon fiber, an aramide fiber with a rayon fiber, and an aramide fiber with a polyester fiber.

In one embodiment, the construction of the weft inserted warp knit fabric tape 310 can have from 2 up to 28 ends per inch (0.7 to 11 ends per centimeter). Number of ends is defined as the number of wales or the number of needles (or gauge) on a warp knitted fabric or the number of warp yarns 312 per cm (or per inch). In one embodiment, there are between 2 and 40 stitches (of the stitching yarn 311) per inch (0.8 and 16 stitches per cm). As an example, with one weft in each four stitches (1 in 3 out), the fabric will contain between 0.5 and 10 wefts per inch (0.2 and 4 wefts per cm).

The pattern stitch used for the stitching yarn 311 is a chain stitch working at least two consecutive stitches on the same needle, working on the left neighbor needle for at least two consecutive stitches, then working back on the first working needle (now next right neighbor needle) to restart a repetitive cycle of two plus two stitches. This can be reversed by working on the first working needle and the right neighbor needle. Two consecutive stitches made on each needle are only an example and could be three, four, five, or more consecutive stitches on each needle. The stitching yarn 311 in a chain stitch may be made with all opened stitches, all closed stitches, or a mixture of opened and closed stitches. In one embodiment, the pattern stitch used for the in-lay warp yarn 312 is a 0.0/1.1 movement around the same needle, alternatively changing at each stitch, one stitch on the right side of the needle and next stitch on the other left side of the same needle or in opposite way first stitch on the left side then second stitch on the right side of the same needle.

The weft yarn 313 could be inserted in each stitch or in a repetitive construction, for example one weft in each four stitches. The terminology used to describe this weft inserted is one stitch with a weft inserted in, called "one in", with three consecutive stitches without a weft inserted in called "3 out". There is no limitation in the construction and in the repeat of the pattern, for example: 1 in 1 out (FIG. 3A-D), 1 in 2 out (FIG. 4A-D), 1 in 3 out (FIGS. 5A-F), 1 in 4 out (FIG. 6A-B), 1 in 5 out (FIG. 7A-B), etc.

Figure 3A:
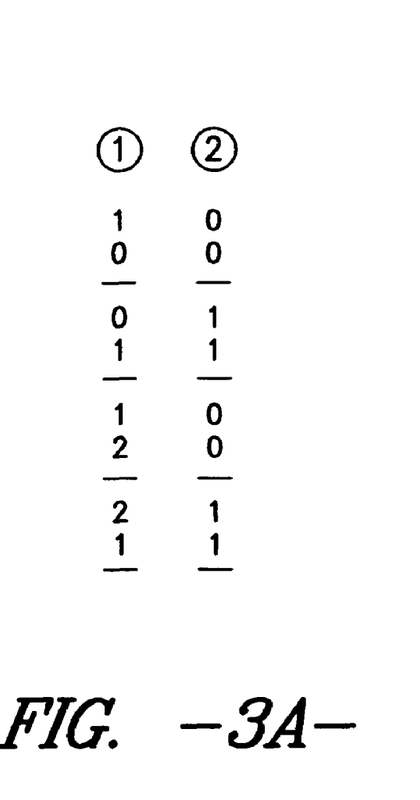
FIG. 3A is a drawing of the chain patterns for the in-lay warp yarn in weft inserted warp knitted fabric with the weft inserted every second stitch.
Figure 3B:
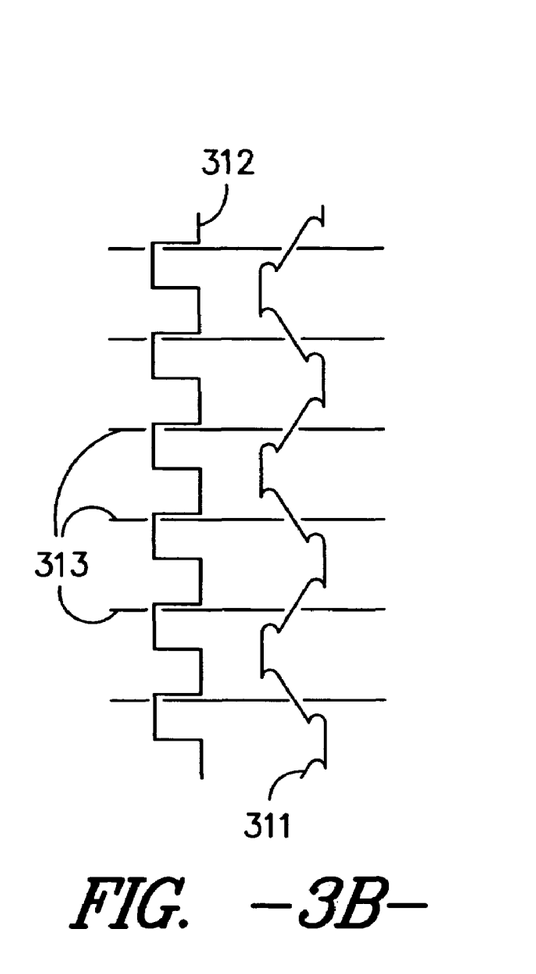
FIG. 3B is a drawing of the lapping movement for the in-lay warp yarn in weft insertion warp knitted fabric with the weft inserted every second stitch.
Figure 3C:
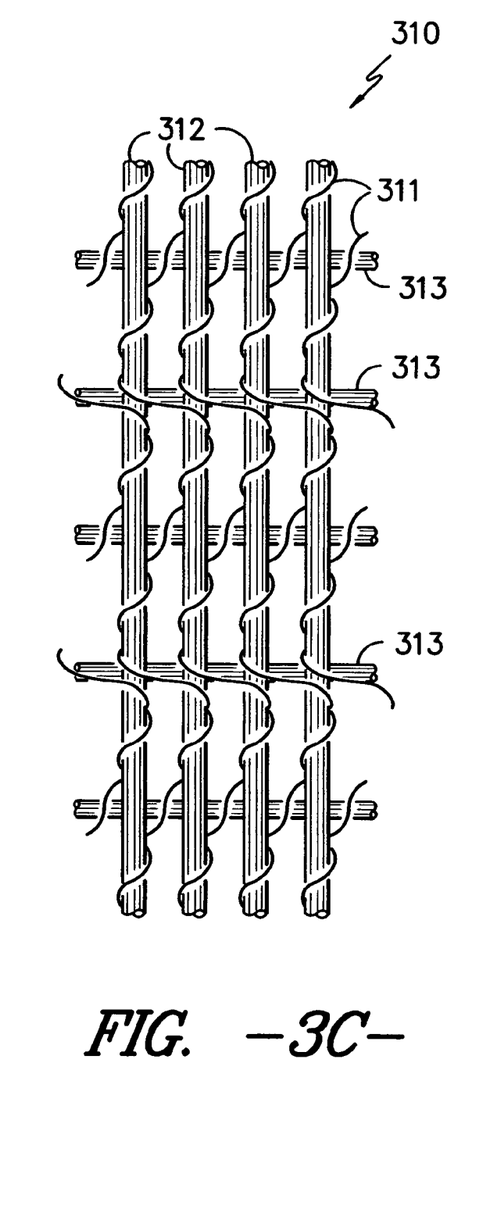
FIG. 3C is a drawing of an in-lay warp yarn in weft inserted warp knitted fabric with the weft inserted every second stitch on the front face (on the knitting machine)
Figure 3D:
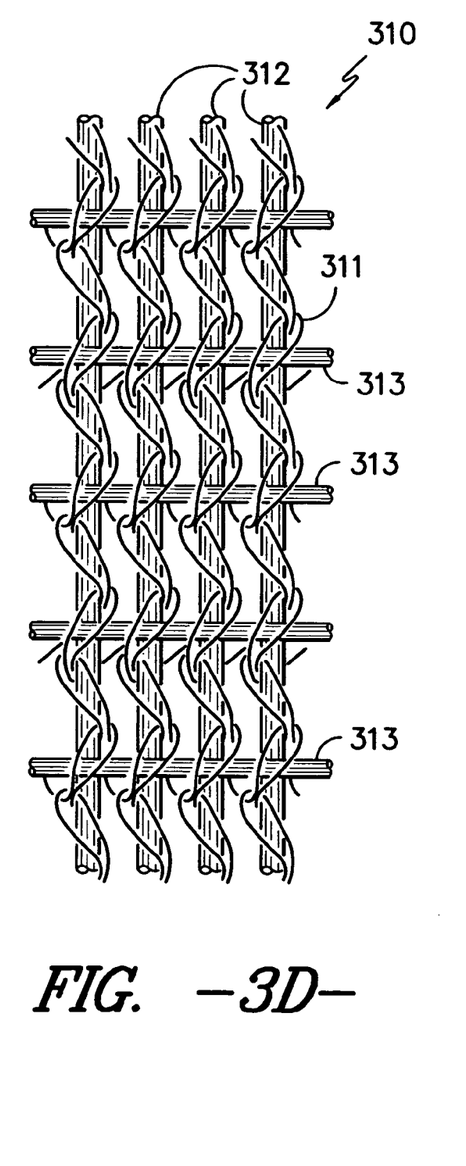
FIG. 3D is a drawing of in-lay warp yarn in weft inserted warp knitted fabric with the weft inserted every second stitch on the back side (on the knitting machine)

FIG. 3A drawing of the chain patterns for the in-lay warp yarn 312 in weft inserted warp knitted fabric with the weft yarn 313 inserted every second stitch of the stitching yarn 311 around the warp yarn 312. FIG. 3B drawing of the lapping movement for the in-lay warp yarn 312 in weft inserted warp knitted fabric with the weft yarn 313 inserted every second stitch of the stitching yarn 311 around the warp yarn 312. FIG. 3C shows the front face (on the knitting machine) of an in-lay warp yarn 312 in weft inserted warp knitted fabric with the weft yarn 313 inserted every second stitch. FIG. 3D shows the back side (on the knitting machine) of the in-lay warp yarn 312 in weft inserted warp knitted fabric tape 310 with the weft yarn 313 inserted every second stitch.

Figure 4A:
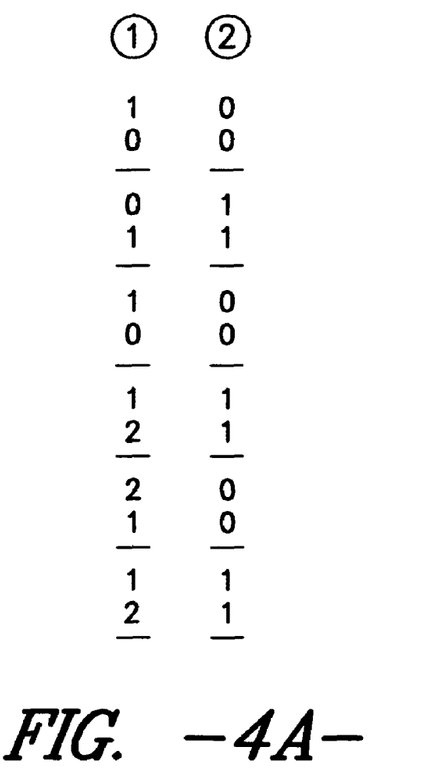
FIG. 4A is a drawing of the chain patterns for the in-lay warp yarn in weft inserted warp knitted fabric with the weft inserted every third stitch.
Figure 4B:
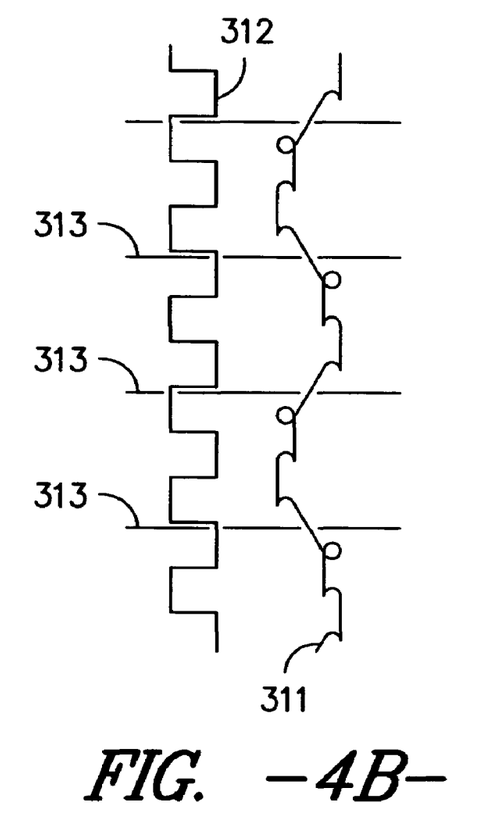
FIG. 4B is a drawing of the lapping movement for the in-lay warp yarn in weft inserted warp knitted fabric with the weft inserted every third stitch.
Figure 4C:
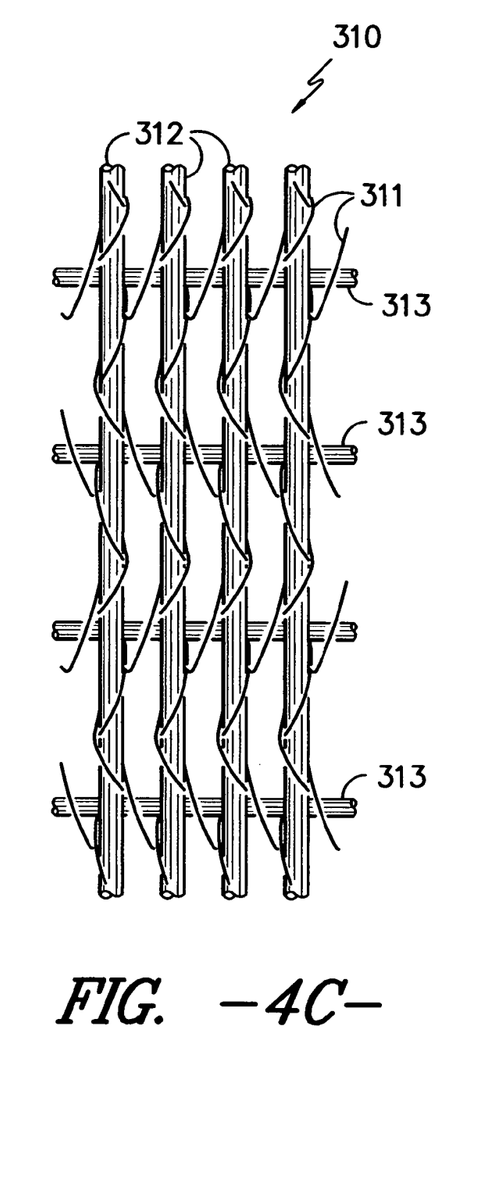
FIG. 4C is a drawing of an in-lay warp yarn in weft inserted warp knitted fabric with the weft inserted every third stitch on the front face.
Figure 4D:
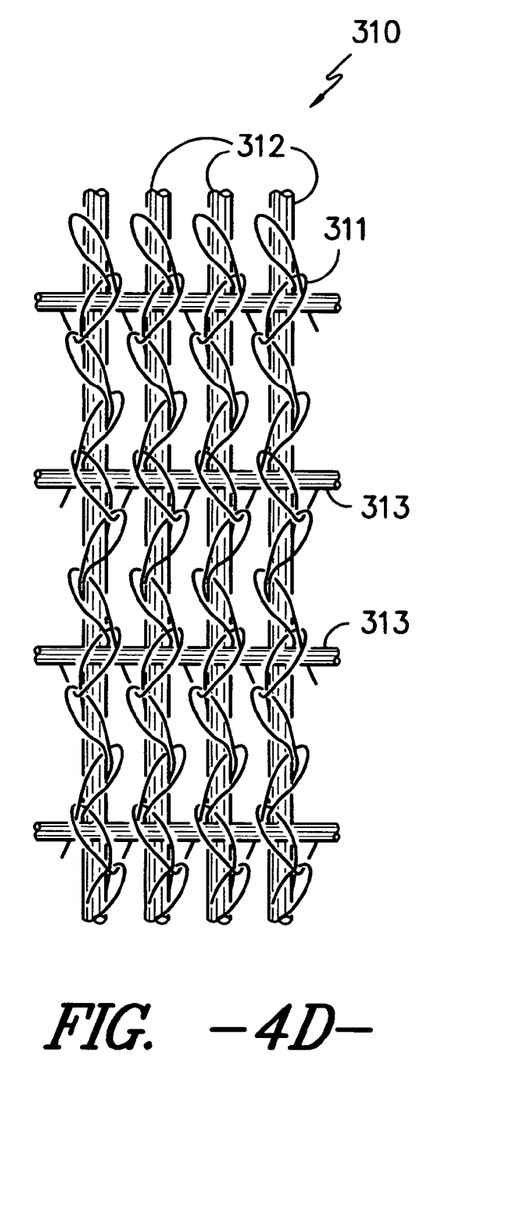
FIG. 4D is a drawing of in-lay warp yarn in weft inserted warp knitted fabric with the weft inserted every third stitch on the back side.

FIG. 4A is a drawing of the chain patterns for the in-lay warp yarns 312 in weft inserted warp knitted fabric tape 310 with the weft inserted every third stitch. FIG. 4B is a drawing of the lapping movement for the in-lay warp yarn 312 in weft inserted warp knitted fabric tape 310 with the weft inserted every third stitch. FIG. 4C shows the front side (on the knitting machine) of an in-lay warp yarn 312 in weft inserted warp knitted fabric tape 310 with the weft yarn 313 inserted every third stitch. FIG. 4D shows the back side (on the knitting machine) of the in-lay warp yarn 312 in weft inserted warp knitted fabric tape 310 with the weft yarn 313 inserted every third stitch.

Figure 5A:
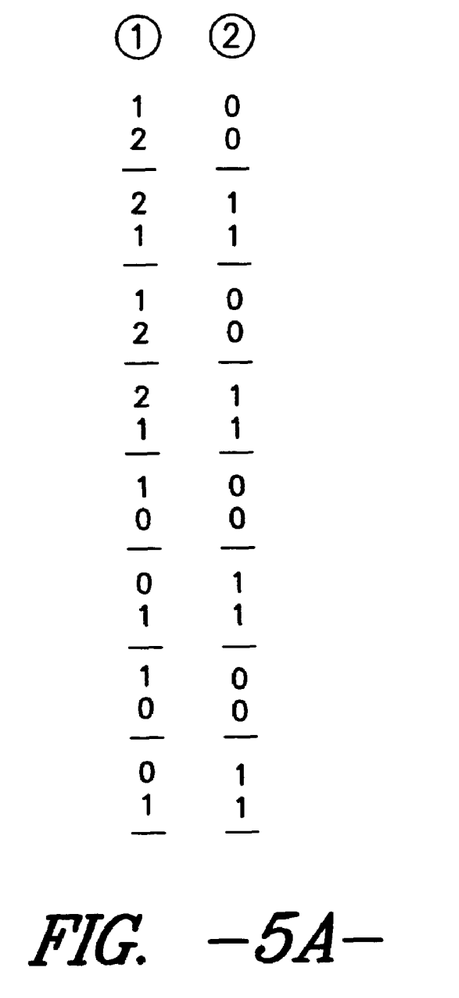
FIG. 5A is a drawing of the chain patterns for the in-lay warp yarn in weft inserted warp knitted fabric with the weft inserted every forth stitch.
Figure 5B:
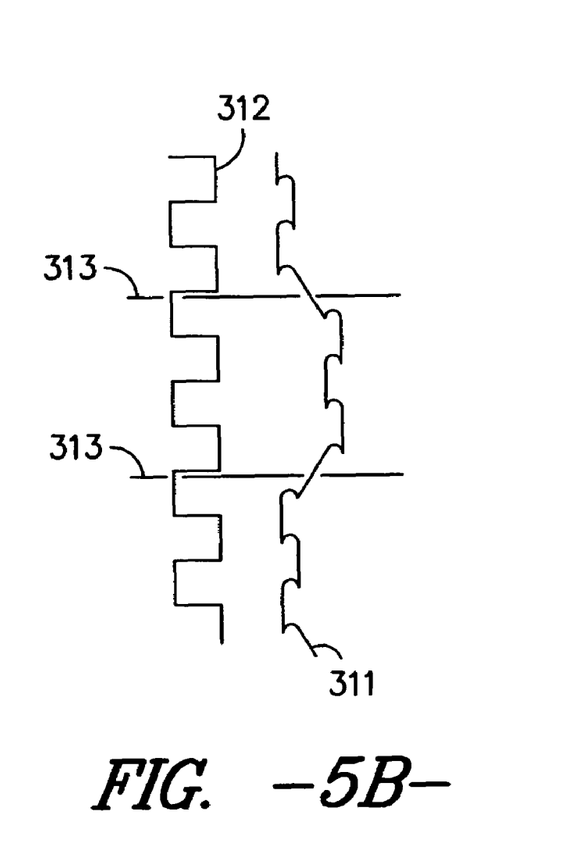
FIG. 5B is a drawing of the lapping movement for the in-lay warp yarn in weft inserted warp knitted fabric with the weft inserted every forth stitch.
Figure 5C:
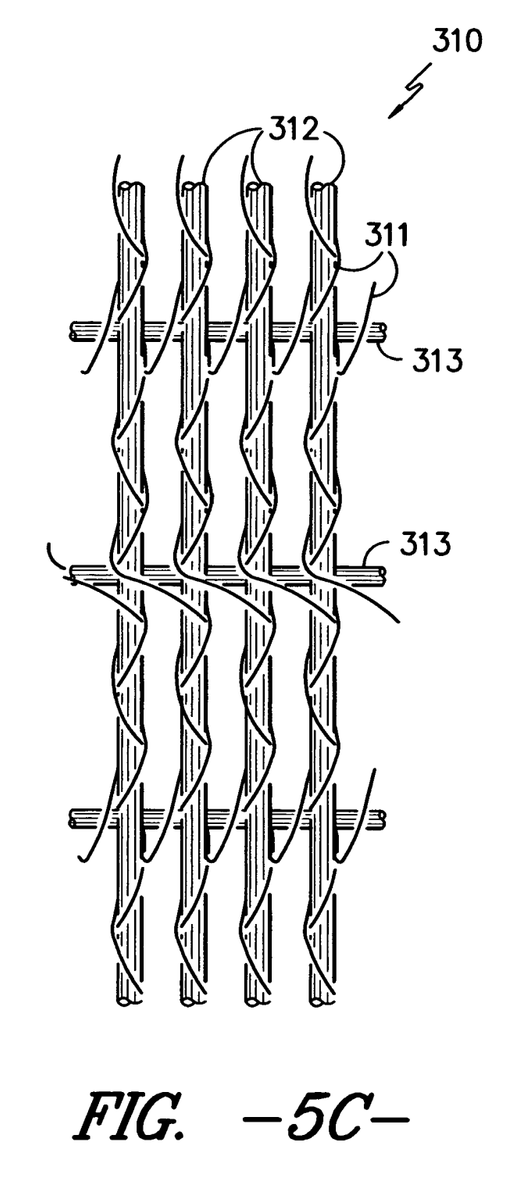
FIG. 5C is a drawing of an in-lay warp yarn in weft inserted warp knitted fabric with the weft inserted every forth stitch on the front face.
Figure 5D:
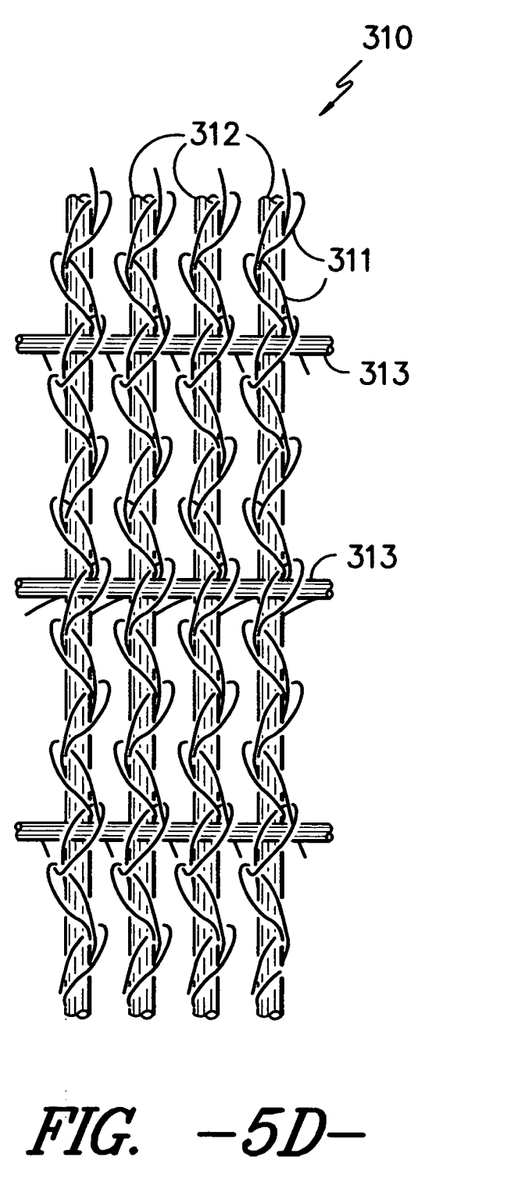
FIG. 5D is a drawing of in-lay warp yarn in weft inserted warp knitted fabric with the weft inserted every forth stitch on the back side.
Figure 5E:
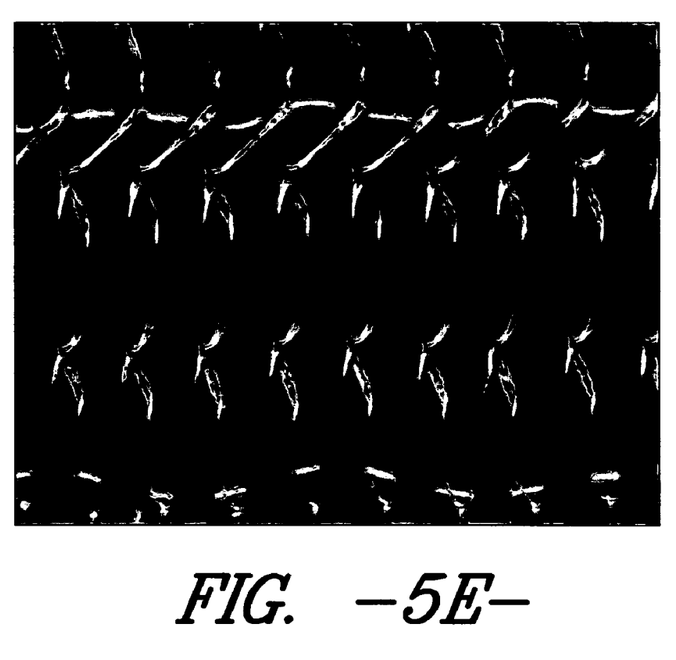
FIG. 5E is an image of an in-lay warp yarn in weft inserted warp knitted fabric with the weft inserted every forth stitch on the front face.
Figure 5F:
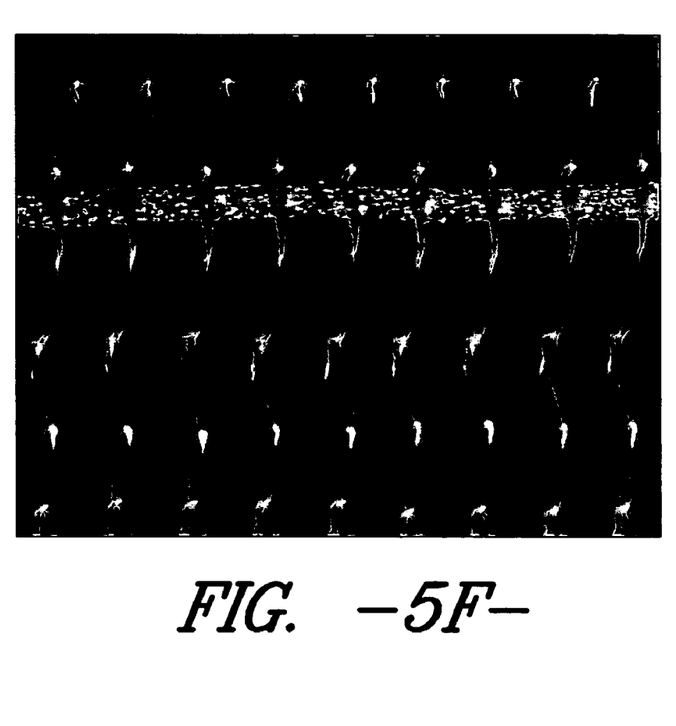
FIG. 5F is an image of in-lay warp yarn in weft inserted warp knitted fabric with the weft inserted every forth stitch on the back side.

FIG. 5A is a drawing of the chain patterns for the in-lay warp yarn 312 in weft inserted warp knitted fabric tape 310 with the weft inserted every forth stitch. FIG. 5B is a drawing of the lapping movement for the in-lay warp yarn 312 in weft inserted warp knitted fabric with the weft inserted every forth stitch. FIG. 5C shows the front face (on the knitting machine) of an in-lay warp yarn 312 in weft inserted warp knitted fabric with the weft yarn 313 inserted every forth stitch. The image of the front face of the finished fabric is shown in FIG. 5E. FIG. 5D shows the back side (on the knitting machine) of the in-lay warp yarn 312 in weft inserted warp knitted fabric with the weft insert yarn 313 inserted every forth stitch. The image of the back side of the finished fabric is shown in FIG. 5F.

Figure 6A:
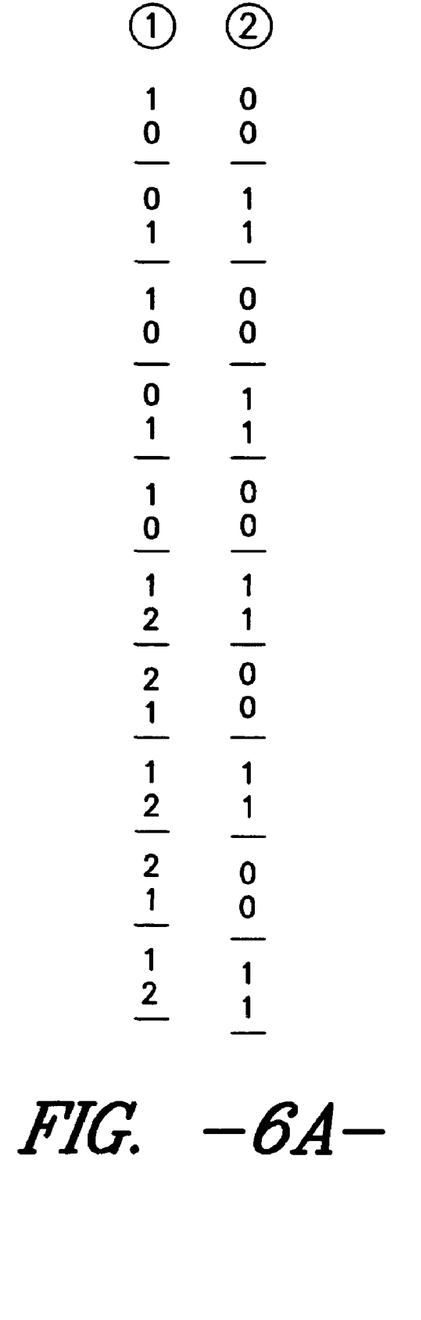
FIG. 6A is a drawing of the chain patterns for the in-lay warp yarn in weft inserted warp knitted fabric with the weft inserted every fifth stitch.
Figure 6B:
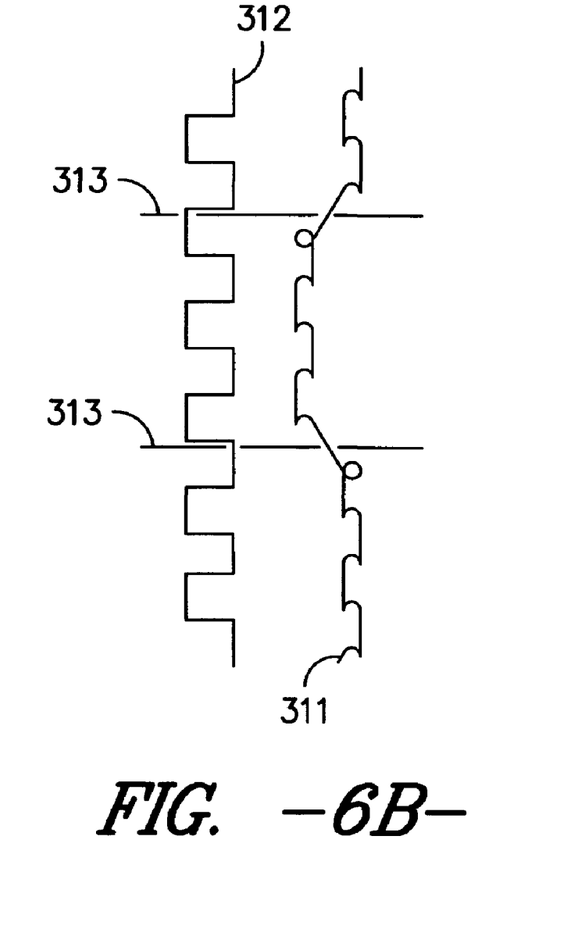
FIG. 6B is a drawing of the lapping movement for the in-lay warp yarn in weft inserted warp knitted fabric with the weft inserted every fifth stitch.
Figures 7A, 7B:
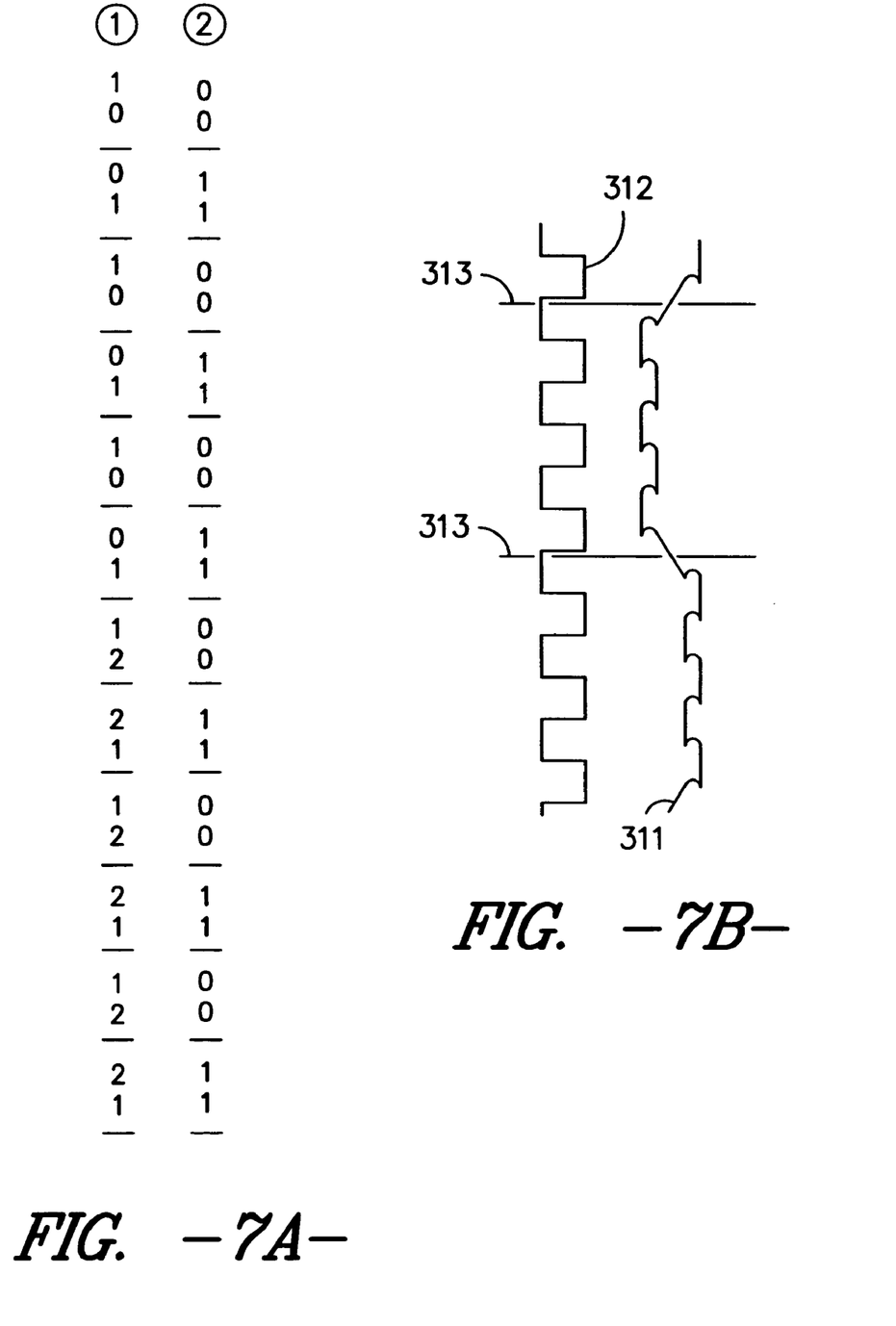
FIG. 7A is a drawing of the chain patterns for the in-lay warp yarn in weft inserted warp knitted fabric with the weft inserted every sixth stitch.
FIG. 7B is a drawing of the lapping movement for the in-lay warp yarn in weft inserted warp knitted fabric with the weft inserted every sixth stitch.

FIG. 6A is a drawing of the chain patterns for the in-lay warp yarn 312 in weft inserted warp knitted fabric with the weft inserted every fifth stitch. FIG. 6B is a drawing of the lapping movement for the in-lay warp yarn 312 in weft inserted warp knitted fabric tape 310 with the weft inserted every fifth stitch. FIG. 7A is a drawing of the chain patterns for the in-lay warp yarn 312 in weft inserted warp knitted fabric with the weft inserted every sixth stitch. FIG. 7B is a drawing of the lapping movement for the in-lay warp yarn 312 in weft inserted warp knitted fabric with the weft inserted every sixth stitch.

In the embodiment shown in FIG. 1A, the weft inserted warp knit fabric tape 310 is located edge to edge as it is laid on the carcass 200 of the tire 100, and is wrapped around the entire belt ply 230 area of the tire 100. In the embodiment shown in FIG. 1B, two pieces of the weft inserted warp knit fabric tape 310 are wrapped around the carcass 200 of the tire 100 such that the cap ply layer 300 extends beyond the edges 232 of the belt plies 230, under the shoulder 108 area of the tire 100. Overlapping the edge 232 of the belt 230 with the weft inserted warp knit fabric tape 310 provides support to the edges 232 of the belt 230 where excessive temperature can build up.

For the embodiment shown in FIG. 1C, the weft inserted warp knit fabric tape 310 is constructed with a width preferably of about 5 mm to 25 mm. More preferably, the weft inserted warp knit fabric tape 310 is constructed with a width of about 8 mm to 15 mm. The width of the weft inserted warp knit fabric tape 310 effects the ability to form a uniform flat layer of the weft inserted warp knit fabric tape 310 across the surface of the carcass 200 of the tire 100. In the helical wrapping process, wider strips will cause buckles on the leading edge of the wrap due to excessive width of the materials. Shorter widths provide difficulties in manufacturing the tire 100 due to an excessive number of revolutions necessary in the wrapping procedure to achieve the desired coverage of the carcass 200 with the weft inserted warp knit fabric tape 310.

Also in the embodiment shown in FIG. 1C, the weft inserted warp knit fabric tape 310 permits the strike through of the rubber in the tire 100 for a better bonded construction. The flat helical pattern typically will need more than three full revolutions of the weft inserted warp knit fabric tape 310 around the carcass 200 of the tire 100. The length of weft inserted warp knit fabric tape 310 will depend on the diameter of the tire 100, the width of the weft inserted warp knit fabric tape 310, and the amount of coverage provided by the weft inserted warp knit fabric tape 310. The approximate minimum length of a weft inserted warp knit fabric tape 310 in a cap ply layer 300, with only one layer of weft inserted warp knit fabric tape 310 and no gaps or over lapping regions, can be calculated according to the following formula:

$$\text{length} = 2\pi r w / t$$

where $\pi$ is 3.14, r is the radius of the tire, w is the width of the area of the tire to be covered, and t is the width of the tape. As an example, for a 185/60/R14 tire, the length of a 13 mm wide weft inserted warp knit fabric tape 310 would be a minimum of about 15 linear meters in length, and can have an additional amount of about 2-3 meters for overlapping itself in the shoulder area. Greater strength can be built into the weft inserted warp knit fabric tape 310 by constructing the weft inserted warp knit fabric tape 310 such that the warp yarns in the weft inserted warp knit fabric tape 310, run longitudinally for the length of tape as continuous uncut yarns. Cross-winding the weft inserted warp knit fabric tape 310 across a cardboard tube provides a convenient package for subsequent removal of the weft inserted warp knit fabric tape 310 in the manufacturing process of tire 100.

The weft inserted warp knit fabric tape 310 can be treated with an adhesion promoter. Typical examples of adhesion promoters included resorcinol formaldehyde latex (RFL), isocyanate based material, epoxy based material, and materials based on melamine formaldehyde resin. The knitted fabric may be impregnated by any chemical treatment after knitting to improve the adhesion of the material used in the fabric with any other material to be reinforced by our fabric (as for example, without any limitation: rubber material, PVC coating material, etc). The knitted substrate is ready to use with or without resin-formaldehyde-latex Impregnation or any other specific treatment after knitting.

The weft inserted warp knit fabric tape 310 may also have a tackified finish applied for facilitating adhesion, or green tack, during the building process of the green tire. The selection of materials for the tackified finish will depend greatly upon the materials selected for use in the tire, and the skilled person on the basis of his common knowledge can easily determine them appropriately. Tackified finishes can be achieved by various methods such as coating the fabric in an aqueous blend of rosin and rubber lattices, or with a solvent solution of an un-vulcanized rubber compound.

The cap ply layer 300, shown in FIGS. 1A-C, can comprises multiple layers, e.g. two, three, or even more layers, of the weft inserted warp knit fabric tape 310 that are wound over the ply layer 230 of the carcass 200 to provide extra strength. In one embodiment, the weft inserted warp knit fabric tape 310 is laid into a double layer in the shoulder 108 area of the tire 100, providing additional strength at the edges 232 of the belt 230. In another embodiment, the cap ply layer 300 can have two layers of weft inserted warp knit fabric tape 310 securing the belt ply 230 across the width of the tire 100. When more than one layer of weft inserted warp knit fabric tape 310 is used for the cap ply 300, a layer of unvulcanized rubber is placed between the layers of weft inserted warp knit fabric tape 310 to insure a good bond. Also, in an embodiment where multiple layers of the weft inserted warp knit fabric tape 310 are used, the layers of weft inserted warp knit fabric tape 310 can be staggered so that upper strips of weft inserted warp knit fabric tape 310 cover the edges of the weft inserted warp knit fabric tape 310 in the lower layer.

The cap ply layer 300 of the present invention can be used with one belt ply, two belt plies (as illustrated in FIGS. 1A-1C and 2), or more than two belt plies below the cap ply layer 300. In an alternate embodiment of the present invention the tire can have multiple belt plies with cap ply layers, disposed over each belt ply layer creating alternating layers of belt plies and cap plies. In the alternate embodiment, the cap ply layer can also overlap the edge of the underlying belt ply, and/or have multiple layers of weft inserted warp knit fabric tape (which can also be staggered so that upper strips overlap edges on lower strips).

The formation of the weft inserted warp knit fabric tape 310 begins with the acquisition of the basic yarns for the fabric. Subsequently, the yarns may be twisted to provide additional mechanical resilience. After the twisting, warp yarns are in-lay warp in a weft inserted warp knit preferably by a Weft Inserted Warp Knit machine (which is typically wider and faster than a weaving machine). The fabric is formed in large widths, such as 61.4 inches. After the fabric formation, the fabric may be finished with adhesive promoter, such as an RFL treatment before or after slitting. The adhesion promoter may also be applied to the yarns before forming into a fabric. If a tackified finish is desired, this is provided following the adhesive promoter finishing. The final fabric is slit into the specific weft inserted warp knit fabric tape 310 widths for placement on a spool. Slitting between the wales of warp yarns (in-lay yarns and stitching yarns) can be done with minimal de-knitting or fraying.

In the tire formation process, the tire carcass 200 is formed with the tire cord 210, metal beads 220, and belt plies 230. After the tire carcass 200 is formed (and is tire shaped), the weft inserted warp knit fabric tape 310 is wound from the package around the belt plies 230 to form the cap ply layer 300. After the cap ply layer 300 is placed on the tire carcass 200, the tread 500 is molded onto the subassembly, and the tire 100 is completed. Alternatively, the fabric tape may be wrapped into the diameter of the finished tire and may or may not have additional layers applied to it, such as tread. Then the tire is formed from a flat shape expanded and shaped into a tire shape to meet up with the ring of fabric tape and the two are joined together.

The present invention overcomes the difficulties of the prior art. Because of the flat helical pattern of the weft inserted warp knit fabric tape 310, there is no overlap area that extends across the width of the tire. Also, the weft inserted warp knit fabric tape 310 is wrapped around the circumference of the tire many times, providing a stronger reinforcement to the belt ply. Further, slitting between the wales of warp yarns (in-lay warp yarns 312 and stitching yarns 311) can be done without de-knitting or fraying. The resulting weft inserted warp knit tape 310 has a precise number of inlay yarns or wale or stitch per inch (or cm), precise spacing of the wales, and weft inserted yarns 313 kept at a right angle to the in-lay warp yarns 312.

What is claimed is:

1. A pneumatic tire comprising:
   a tread;
   a carcass having at least one belt ply disposed below the tread; and,
   a cap ply located between the carcass and the tread, wherein the cap ply comprises at least one layer of a weft inserted warp knit fabric tape comprising an in-lay warp yarn set, a weft inserted yarn set, and a stitching yarn set, wherein the stitching yarn set forms a repeating stitch pattern on each warp yarn comprising a sequence of at least 2 stitches around the warp yarn from one stitching yarn and at least 2 stitches around the warp yarn from the adjacent stitching yarn, wherein each stitch from the stitching yarn is around a warn yarn, disposed around the circumference of the carcass in the area of the belt ply.

2. The tire of claim 1, wherein the weft inserted yarns are inserted in each stitch of the stitching yarn set.

3. The tire of claim 1, wherein the weft inserted yarns are inserted in a repetitive construction in the stitches of the stitching yarn set.

4. The tire of claim 1, wherein the weft inserted yarns are inserted in every second stitch of the stitching yarn set.

5. The tire of claim 1, wherein the weft inserted yarns are inserted in every third stitch of the stitching yarn set.

6. The tire of claim 1, wherein the weft inserted yarns are inserted in every forth stitch of the stitching yarn set.

7. The tire of claim 1, wherein the in-lay warp yarns have a weight per unit length of between 100 to 23,500 decitex (90 to 21,000 deniers).

8. The tire of claim 1, wherein the stitching yarns have a weight per unit length of between 22 to 470 decitex (20 to 420 deniers).

9. The tire of claim 1, wherein the repeating stitch pattern on each in-lay warp yarn comprising a sequence of at least 3 stitches around the warp yarn from one stitching yarn and at least 3 stitches around the warp yarn from the adjacent stitching yarn.

10. The tire of claim 1, wherein the repeating stitch pattern on each in-lay warp yarn comprising a sequence of at least X stitches around the warp yarn from one stitching yarn and at least X stitches around the warp yarn from the adjacent stitching yarn, wherein X is selected from the following group consisting of 4, 5, 6, 7, 8, 9, and 10.

11. The tire of claim 1, wherein the cap ply is disposed in a flat helical pattern around the circumference of the carcass in the area of the belt ply.

12. The tire according to claim 1, wherein the weft inserted warp knit fabric tape further includes an adhesion promoter disposed thereon.

13. The tire according to claim 1, wherein the cap ply has two or more layers of the weft inserted warp knit fabric.

14. The tire according to claim 13, wherein the tire includes a layer of rubber between the layers of the weft inserted warp knit fabric tape.

15. The tire according to claim 1, wherein the tire further includes a second belt ply placed over the cap ply and a second cap ply layer over the second belt ply and below the tire tread.

16. The tire according to claim 1, wherein the in-lay warp yarns comprise hybrid yarns.

17. The tire according to claim 1, wherein the weft inserted yarns comprise hybrid yarns.

18. The tire according to claim 1, wherein the stitching yarns comprise hybrid yarns.

19. The tire according to claim 1, wherein the weft inserted warp knit fabric tape has a width in a range of from about 5 mm to about 25 mm.

20. The tire according to claim 1, wherein the weft inserted warp knit fabric tape has a width in a range of from about 8 mm to about 15 mm.

21. The tire according to claim 1, wherein the weft inserted warp knit fabric tape makes more than three full revolutions around the circumference of the tire carcass.

22. The tire according to claim 1, wherein the in-lay warp yarns of the weft inserted warp knit fabric tape are continuous for the length of the weft inserted warp knit fabric tape.

23. The tire according to claim 1, wherein the outside edges of the weft inserted warp knit fabric tape each have a pair of in-lay warp yarns which are continuous for the length of the weft inserted warp knit fabric tape.

24. The tire of claim 1 wherein a weft yarn is inserted into the fabric each time the stitching yarn moves from one warp yarn to an adjacent warp yarn.

\* \* \* \* \*